United States Patent [19]

Alvarez

[11] 4,188,014
[45] Feb. 12, 1980

[54] GATE VALVE WITH POSITION RESPONSIVE INTERLOCK

[75] Inventor: Patricio D. Alvarez, Rosenberg, Tex.

[73] Assignee: ACF Industries, Incorporated, New York, N.Y.

[21] Appl. No.: 950,494

[22] Filed: Oct. 11, 1978

[51] Int. Cl.² ............................................. F16K 25/00
[52] U.S. Cl. ................... 251/196; 251/167; 251/199
[58] Field of Search .................... 251/167, 196, 199

[56] References Cited

U.S. PATENT DOCUMENTS

| 2,583,512 | 1/1952 | Laurent | 251/196 |
| 2,855,175 | 10/1958 | Dunbar | 251/196 |

Primary Examiner—Harold W. Weakley
Attorney, Agent, or Firm—Eugene N. Riddle

[57] ABSTRACT

An improved gate valve of the expanding type wherein a gate and segment assembly having cooperative wedge surfaces are moved linearly between a pair of valve seats to block the flow therebetween in one position and open the flow in another, the fluid flowing through aligned ports in the gate and segment in such open position. The improvement lies in substituting for prior art springs a guide rail (28, 28′) fixed to the valve housing or body and extending parallel to the stroke of the movable members, together with a rocker arm (54) pivotally mounted on one member and having a slot (66) receiving a pin (58) out of the other. A pair of lobes (64) extend from the opposed ends of the rocker arm (54) and contact the guide member. When the gate and segment assembly are at any position between the ends of its stroke, the rocker arm keeps both pairs of wedge surfaces tightly in contact, preventing any expansion. At either end position, one of the rocker lobes enters a gap in the guide rail, permitting the rocker to rotate and allowing wedging action between the two members to expand their overall thickness.

10 Claims, 3 Drawing Figures

GATE VALVE WITH POSITION RESPONSIVE INTERLOCK

FIELD OF THE INVENTION

The present invention concerns fluid flow valves generally, and is more particularly addressed to gate valves. Yet more particularly, the invention involves improvements to gate valves of the type wherein a pair of cooperating members which interface each other with two pairs of diverging wedge surfaces are movable linearly between a blocking position and an open flow position and provide sealing action against a pair of opposed valve seats in either position.

BACKGROUND OF THE INVENTION

Gate valves of the sliding gate and segment type have been used extensively for many years, and from the beginning, the design engineer has faced this problem. At either end of the stroke of the pair of members, they must be expanded in thickness by stopping one member and pushing or pulling on the other to cause it to climb the wedging surface of the halted member, thus sealing against the valve seals. Between extremities, on the other hand, it is necessary to minimize the thickness of the sliding members so that they will not bind against the valve seats and jamb the gate and segment in a half-and-half position.

Prior art solutions to this problem fall into two general categories, springs and centralizers. The former is exemplified in the U.S. patent to Dunbar and Sanders, issued in 1960 as U.S. Pat. No. 2,954,960. This patent discloses the use of an ox yoke spring over a central pin in one member and having its ends tucked under a pair of opposed pins protruding from the other member. The spring forces the two members together so long as no opposed axial forces are exerted on the members. At the end of a stroke, when the floating segment member is halted by contact with a fixed stop member, an axial force exerted on the gate member through the control stem causes it to climb up the now fixed segment member, thus expanding the assembly and causing it to seal against the opposed valve seats. It should be noted that with this type of assembly, the force applied to the gate member must first overcome the spring force.

The centralizer type of structure is exemplified in U.S. Pat. No. 2,583,512, issued to Laurent in 1952. Even a summary description of this structure would be too lengthy to set forth here, but it will be noted that the structure is complicated and includes a pair of fixed guides and a mechanical interlock between gate and segment. The latter includes a guide shoe which, during any sliding movement of the gate and segment, is constrained to travel in contact with both fixed guides; in such position, the elements linked to the guide shoe force the gate and segment to stay in a central position in which they are pressed together with both pairs of inclined surfaces in tight contact.

SUMMARY OF THE INVENTION

While springs and centralizers have done yeoman service, and indeed are still the standard of the industry, they do have disadvantages which the present inventor proposes to avoid. In the present invention, springs are avoided and the number of interlocking parts are kept to a minimum. A single guide rail is secured to the housing adjacent one of the valve seats and extending parallel to the direction traveled by the gate assembly. This rail is provided with a single gap located for timely reception of a rocker member mounted on the moving assembly.

The rocker is a simple plate member having the general shape of an isosceles triangle, the base having elongated in the stroke direction of the valve and disposed, in traveling position, generally parallel to the guide rail. Centrally of the base the rocker is pivotally secured to the nearer of the two gate sections and above this pivot, overlying the other member of the gate assembly, is a slot which receives a pin protruding from such member, the slot having a width to snugly receive the pin and being elongated in the direction between pivot point and the opposed apex of the triangular rocker arm. The triangular shape is modified at the other two apices, at the opposed ends of the base, where a pair of lobes entend toward the guide rail and contact the same.

The gap in the guide rail is located along its length to correspond to the end positions of the slidable gate assembly; i.e., the lobe at one end of the rocker can enter the gap only when the segment member can move no further and additional force is exerted on the gate. This causes the rocker to pivot and permits the gate to slide on the wedge surface of the segment, expanding the thickness of the gate assembly and causing it to seal against the opposed seats. Between such extremities, both lobes of the rocker arm contact the guide rail and keep both pairs of wedge surfaces in tight contact, minimizing their overall thickness and preventing any drag against the valve seats.

SHORT DESCRIPTION OF THE DRAWING FIGURES

The invention will probably be more readily comprehended by referring to the attached drawing forming a part of the present disclosure. In the drawing.

DETAILED DESCRIPTION OF THE DRAWING FIGURES

Figure 1:
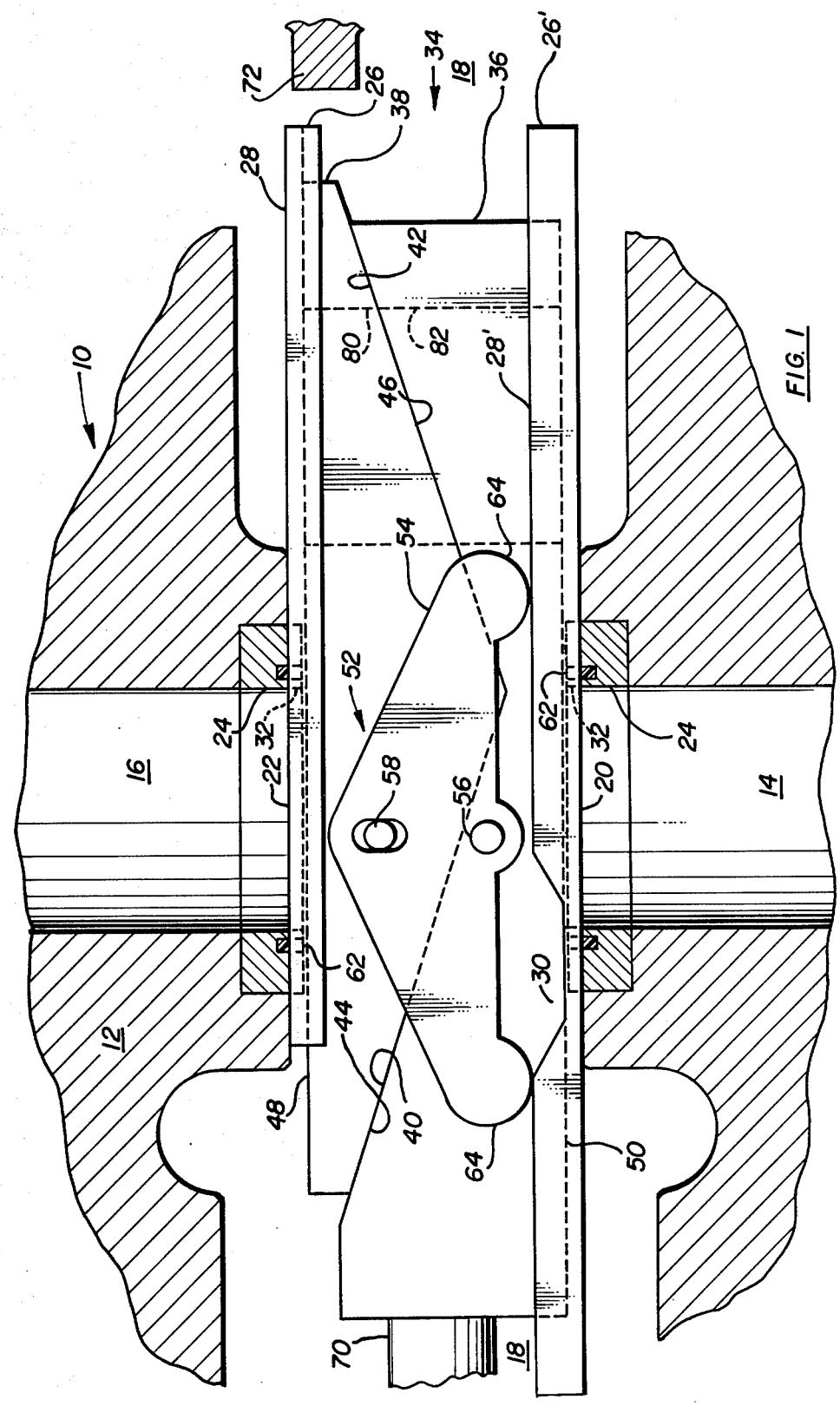
FIG. 1 is a longitudinal section through the body of a gate valve embodying the invention, this view showing the positions of the parts during travel of the gate assembly between open and closed positions, or vice versa.
Figure 2:
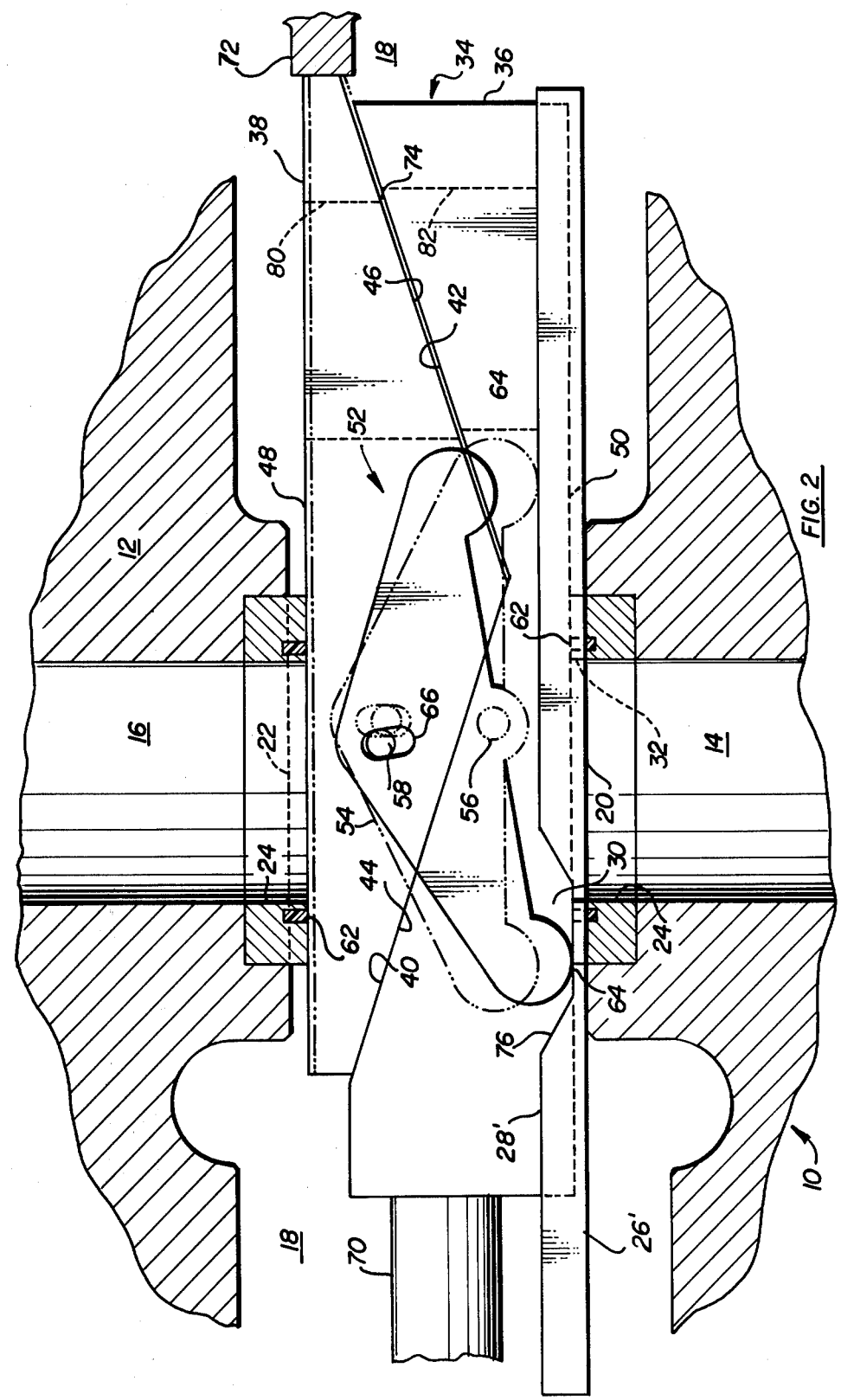
FIG. 2 is a longitudinal section like FIG. 1, this view showing the positions of the parts in either open or closed position, after the gate assembly has been expanded to seal against the opposed valve seats.
Figure 3:
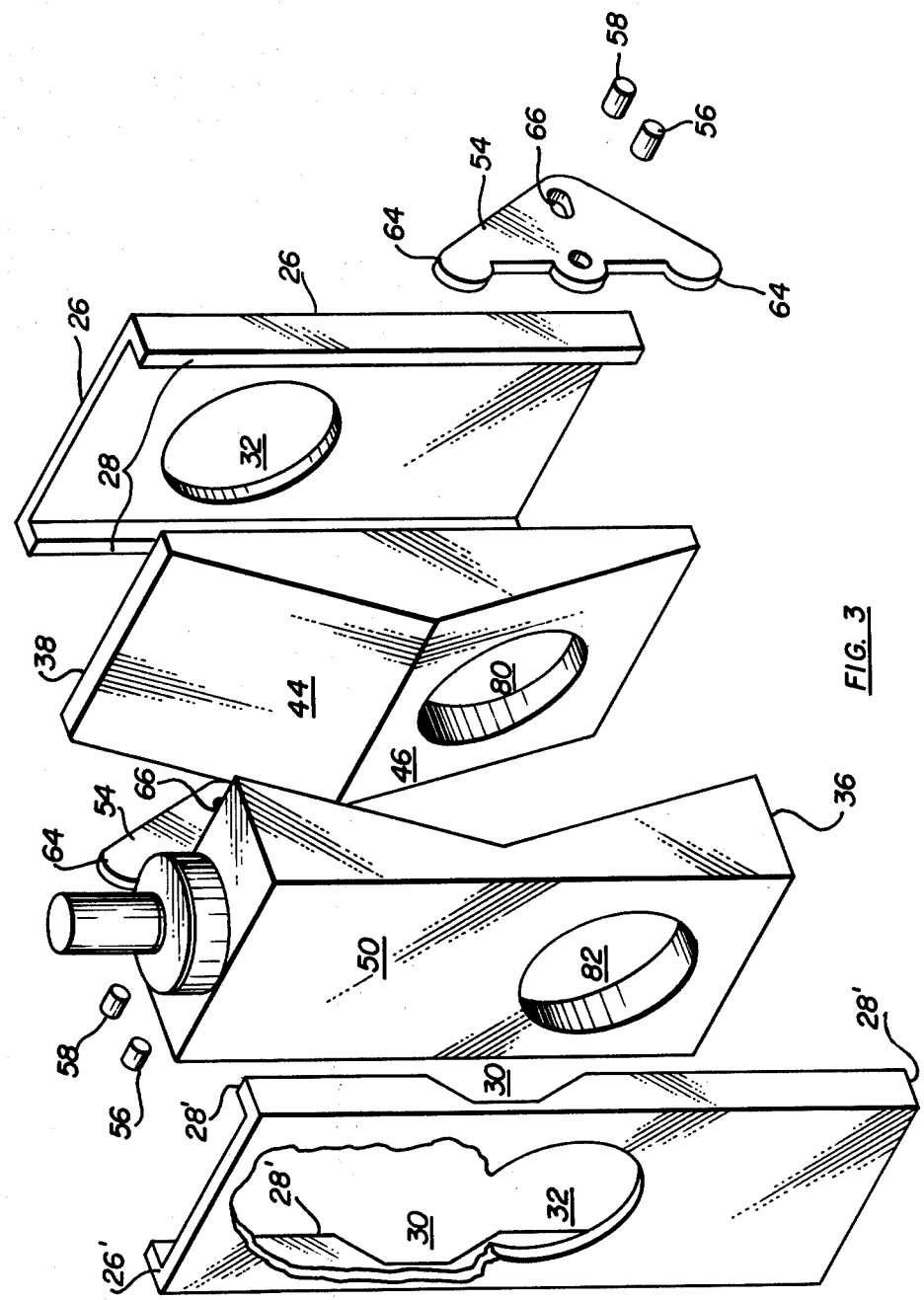
FIG. 3 is an exploded isometric view showing the principal components of the assembly.

FIGS. 1 and 2 show a gate valve 10 comprising a housing 12 having a through passageway 14, 16 interrupted by an orthogonal interior valve chamber 18 which houses the gate mechanism of the valve. The two portions 14, 16 of the interrupted fluid passageway intersect the gate operating chamber 18 in opposed ports, respectively 20 and 22, which lie in opposed parallel planes and are there provided with seats. While various types of seats including metal-to-metal may be utilized, the drawing illustrates replaceable seats 24 secured in the indicated couterbores in the housing wall which defines ports 20 and 22.

The conventional assembly includes a pair of seat skirts 26 which surround the seats and are provided with a pair of inturned edge flanges 28 which serve as guides for the traveling gate assembly. In the present invention, one of the seat skirts is modified and is designated 26', the modification consisting of providing in the flanges or guard rails 28' a gap 30 which is disposed along the length of rail 28' at a preselected location enabling it to receive one of the lobes 64 of rocker arm 54, as discussed further below.

It should be noted that the openings 32 in skirts 26 26' are of a diameter to receive the seats 24, which protrude from ports 20 and 22 through openings 32 so that the sealing contacts are between the flat surfaces 48 and 50 of the gate members and the planar outer ends 62 of the seats. These openings 32, of course, are aligned with passageways 82 and 80 in gate 36 and segment 38 when the latter are in their end position corresponding to an open valve. The two guard rails 28 and 28' of either skirt 26 or 26' extend lengthwise in the direction of travel of the gate assembly, of course, and are spaced from one another by the width of such assembly, plus a small operational clearance.

FIG. 1 shows the gate assembly 34, consisting of gate 36 and segment 38 in its traveling attitude, which is the attitude it is designed and forced to assume in all positions of gate assembly 34 except at the opposed ends of its linear stroke. Such two positions, which can be designated sealed open and sealed closed, are the only two positions calling for wedging action between the gate 36 and segment 38. In all other positions, the divergent wedge surfaces 40 and 42 of gate 36 are in tight contact with the corresponding interfacing wedge surfaces 44 and 46 of segment 36, 40 with 44 and 42 with 46. It should be noted that there is no gap between either of these two pairs of contacting surfaces. In such attitude, it is apparent that the overall thickness of the assembly 34, measured along a perpendicular between the opposed and parallel flat outer surfaces 48 and 50 of segment 38 and gate 36, is at a minimum. With such minimum thickness, there is an operational clearance between each sealing surface 48 and 50 and the sealing surfaces 62 of valve seats 24, insuring that the gate assembly 34 can be moved without binding.

Such gapless contact between the diverging wedge surfaces 40–44 and 42–46 is insured by the disposition of the positioning device assembly 52, consisting of the rocker arm 54 and the pair of pins 56 and 58. The rocker arm 54 is basically a thin plate having the general form of an isosceles triangle with its base leg extending generally parallel to the guide rail 28'. At the opposed ends of this base leg, a pair of lobes 64 extend downwardly toward the guide rail, and in the traveling attitude of the assembly shown in FIG. 1, these lobes 64 both contact the upper edge of the guide rail.

The pin 56 extends through rocker arm 54 and is secured in an opening in the gate member 36. It serves as the pivot point for the rocker arm, and moves linearly with the rocker arm with each stroke. Rocker arm 54 thus has only one degree of freedom, rotation about pivot pin 56, and so long as both of its lobes 64 are in contact with guide rail 28', even this one degree of freedom can not be exercised.

The positioning device 52 is completed by the pin 58 secured in and extending from the side surface of segment 38 and through the slot 66 in rocker 54. Slot 66 has a width measured along the direction of the gate assembly to receive pin 58 in snug relationship but is elongated in the orthogonal direction, in the direction of fluid flow through the valve.

In FIG. 1, the gate assembly is being pushed toward the right end position by the stem 70, which is rigidly secured to the gate 36, carrying segment 38 with the assembly. Although the left hand lobe 64 is about to encounter the gap 30 in guide rail 28', the entire assembly is free to move to the right in the figure until one member of the gate assembly encounters a stop. It is important to note that the positioning device is not self operating; there is no rotation of the rocker arm 54 simply because a lobe 64 is in registry with the gap. Something further must occur before the rocker arm rotates; it must be compelled to rotate.

That further action is illustrated in FIG. 2, which actually shows the positions of the parts at the end of two steps in a sealing sequence. First, the segment member 38 of the assembly has contacted stop 72, which is part of the fixed housing 12, halting any further movement of this member to the right. Secondly, continued rightward thrust applied to gate member 36 through the stem 70 has caused it to move further to the right, further than segment 38. In so doing, wedge surface 40 of the gate pushes against wedge surface 44 of the segment and actually slides along it for a short distance. The segment 38 is lifted up, pushing it into sealing contact with the upper seat 24, and at the same time the gate member 36 is pushed into sealing contact with lower seat 24. A gap 74 is opened between wedge surfaces 42 and 46, the size of which gap is indicative of the increase in thickness of the gate assembly.

Such expansion of the gate assembly is accompanied by a counter-clockwise rotation of rocker 54, so that its left hand lobe 64 enters gap 30. Such rotation occurs because pivot pin 56 moves to the right relative to slot pin 58, the effect being the same as though pin 58 has moved to the left relative to pin 56. Pin 58 pushes to the left against the wall of slot 66, bringing about the rotation. It would seem that such pushing action would occur even if there were no slot 66, i.e., if this opening were circular, receiving pin 58 snugly on all sides. However, the opening must be slotted as shown to accommodate the movement of pin 58 upwardly as segment 38 is raised during the wedging action; without the slot, such upward movement can not take place and the gate and segment members would remain locked in their traveling relationship.

It is also important to note that, although it is necessary that the rocker arm rotate as described in order that the gate assembly expand its thickness and seal against the valve seats, the time when such expansion in thickness occurs is not dictated by the time when the lobe 64 arrives in the proximity of gap 30. The chain of events is initiated by the stopping of segment 38 by stop member 72, and then by the continued travel of gate 36. Thus, the precise location of gap 30 along guide rail 28' is not critical, and some manufacturing tolerance is permissible.

Having read the description of one sealing sequence, the sequence of the reverse movement will be apparent to the reader. As the rightward thrust through stem 70 is relaxed and a leftward pull is exerted through it on gate 36, the gate will move leftward a short distance to close gap 74. Such short motion will at the same time cause rocker arm 54 to rotate clockwise to its FIG. 1 position, aided if necessary by the cam surface 76 at the left end of gap 30. This rotation will pull segment 38 and gate 36 back into their minimum thickness positions with both pairs of interfacing wedge surfaces in tight contact.

The reverse stroke, leftward in the figures, will be as depicted in FIG. 1, and the sequence at the end of such stroke will be more or less a mirror image of that described. The wedging and expansion and sealing will be initiated when the left hand end of segment 38 strikes a fixed stop and further pull is applied to the gate member. A gap will be formed between wedge surfaces 40 and 44 as wedge surface 42 pushes against 46 and forces segment 38 into sealing position. This time the rocker arm 54 rotates clockwise, and the right hand lobe 64 enters the same gap 30. Again, the precise location of the gap is not critical.

Having described a preferred embodiment, the present inventor wishes it to be known that he does not consider himself limited thereby. Many substantially similar means for accomplishing the same result in substantially the same manner will be apparent to those of average skill in the art, and such means are to be considered within the scope of the invention, which is to be judged only by the appended claims.

What is claimed is:

1. A gate valve comprising:
   a housing having a valve chamber therein and inlet and outlet flow passageways communicating with the valve chamber, a seat about each flow passageway, an expansible ported gate assembly mounted in said chamber for linear movement between open and closed positions relative to the passageways;
   said gate assembly comprising a gate member and a segment member, the gate member being connected to a control stem extending to one end of the housing while the segment member floats in depedence on the gate member, said two members having parallel outer sealing surfaces to engage the valve seats and complementary inner surfaces so that the two members interface one another, each of said inner surfaces being a bifurcated surface inclined with respect to the sealing surfaces and diverging away from a point at about its mid-length to form two pairs of wedging surfaces which operate to expand the assembly normally to said seats into sealing engagement therewith, said members having a pair of opposed side surfaces joining said outer and inner surfaces, and also having the aligned ports through one of the pairs of wedging surfaces,
   said gate assembly also having a positioning device interconnecting said gate and segment members, said positioning device including
   a guide rail secured to the interior of said valve chamber adjacent one of said seats and extending parallel the direction of travel of the gate assembly, said guide rail having an interruption therein, and
   a rocker arm pivotally secured to one of the two gate assembly members through one of the side surfaces thereof adjacent said guide rail, the rocker arm having a slot engaging a pin protruding from the corresponding side surface of the other member,
   said rocker arm also a pair of downwardly extending lobes at its opposed extremities, on opposed sides of its connection to the two members, said lobes contacting and riding on said guide rail except when one of them enters the interruption in the guide rail and permits the rocker arm to rotate,
   whereby during movement of the gate assembly between the two sealing positions at the ends of its stroke, said rocker arm lobes are both in contact with the guide rail and maintain the two members in non-wedging and non-expansive relationship with one another, preventing drag between the moving assembly and the valve seats, while at the ends of the stroke of the assembly, one of said lobes enters the interruption in the guide rail and permits the two members to be wedged into sealing relationship with the valve seats.

2. In a gate valve of the type including a gate assembly slidable linearly between opposed seats of an interrupted fluid passageway, the gate assembly comprising a gate member connected to a control stem and a segment member which is floating is moved by the gate member, each said member having the shape of a modified rectangular parallelepiped having a length elongated in the direction of movement, normal to the flow direction between said sides, a width also normal to said flow direction smaller than its length, and of relatively small thickness, parallel to said flow direction, said two members having opposed and parallel outer surfaces to engage and seal against said seats at opposed ends of the strokes of the assembly and inner surfaces which are modified to provide two pairs of interfacing surfaces inclined with respect to said seats to provide wedging action when the segment member is halted by an appropriate stop and the linear motion of the gate is continued, the two inclined surfaces on each member sloping divergingly from one another,
   the improvement comprising means to lock said two members in non-wedging relationship to each other during movement of the gate assembly and permit such wedging to occur at the ends of such movement,
   said improvement comprising a guide rail secured to one of said seats and extending parallel to the direction of movement of the gate assembly, said guide rail having a gap along its length, and
   a rocker arm pivotally secured to one of the members in the side thereof corresponding to its thickness and adjacent said guide rail, said rocker also having a slot therein extending parallel to the direction of flow between said seats and accommodating therein a pin protruding from the adjacent side of the other member, and also having a pair of lobes extending downwardly and contacting said guide rail, each said lobe being adapted to enter the gap in the guide rail when positioned in registry with the same at the end of a stroke of the gate assembly, permitting the rocker arm to rotate and permitting wedging action and lateral expansion between the members of the assembly.

3. The improved gate valve of claim 2 in which said rocker arm has a normal position in which both said lobes are in contact with the guide rail and both pairs of wedging surfaces of the gate and segment member are in contact to minimize the thickness of the gate assembly and provide operating clearance with the valve seats, the rocker arm in such normal position locking the two members together to prevent relative motion therebetween.

4. The improved gate valve of claim 3 in which said rocker arm is a plate member having the general shape of an isosceles triangle having an elongated base extending generally parallel to said guide rail and said lobes extending downwardly from said base toward the guide rail.

5. The improved gate valve of claim 3 in which there are a pair of said guide rails secured to the opposed pair of seats and a pair of rocker arms pivotally secured to the opposed sides of the gate and segment members.

6. A gate valve comprising:

a housing forming a valve chamber having a pair of aligned ports with opposed parallel seats;

a gate valve assembly mounted for linear movement between said seats in opposed directions parallel to said seats to open and closed valve positions at the ends of its stroke, said assembly being expansible normal to said directions to contact and seal against said opposed seats;

the gate valve assembly comprising two ported abutting members having an elongated length along said directions of movement, a pair of parallel and opposed lateral outer sealing surfaces to engage said seats, a pair of opposed outer edge surfaces extending generally normally between said sealing surfaces, and complementary interfacing inner faces each formed with a pair of surfaces that diverge transversely from a common apex at about the center of said members towards the ends thereof to form two pairs of interfacing wedge surfaces operably effective to expand said members toward said seats upon relative lengthwise displacement between the two members from a starting position in which said apices are coincident and both of said wedge surfaces of one member are in full contact with the complementary interfacing wedge surfaces of the other;

means for moving said gate valve assembly linearly between the opposed ends of its strokes, corresponding to open and closed positions of the valve;

means for defining said ends of the stroke of the assembly by providing a stop for one member of such assembly but not the other; and means for interconnecting the two members of the assembly to prevent wedging and expansion action during strokes thereof while permitting the same at the stroke ends, said last means comprising:

a guide rail fixed with said valve chamber and extending parallel to said linear movement direction of the valve assembly and having at least one interruption or gap therein, and a rocker arm pivotably secured to one of the edge surfaces of one of said members and having a slot therethrough receiving a pin extending from the adjacent edge surface of the other member, said slot having a length elongated between the sealing surfaces of the members and a width to snugly receive said pin, said rocker arm being a relatively thin plate disposed parallel to said edge surfaces and having in outline a base edge elongated parallel and spaced from one of said sealing surfaces and said guide rail, said plate overlying the edge surfaces of both members and extending toward the opposed sealing surface, said base extending in both directions from the pivot point and terminating in opposed ends, there being at each end a lobe projecting toward and contacting said guide rail when the moving gate valve assembly is between its valve open and valve closed end positions, said rocker arm also having a rotated position corresponding to said end positions of the gate valve assembly in which one of said lobes enters the gap in said guide rail.

7. The gate valve of claim 6 in which said rocker arm has a normal position in which both said lobes are in contact with the guide rail and both pairs of wedging surfaces of the gate and segment are in contact to minimize the thickness of the gate assembly and provide operating clearance with the valve seats, the rocker arm in such normal position locking the two members together to prevent relative motion therebetween.

8. The gate valve of claim 6 in which the distance between said two lobes is equal to the distance traveled by the gate valve assembly between its end positions, whereby said gap in the guide rail accommodates said lobes alternately as the assembly reaches its opposed end positions and the rocker arm is urged into clockwise and counterclockwise rotated positions.

9. In a gate valve structure of the expanding type having a valve chamber and an expanding gate assembly mounted in the valve chamber for movement between open and closed positions, the gate assembly including a gate member and segment member carried by the gate member with wedging surfaces between the members permitting a wedging action to provide lateral expansion at fully closed position; an improved positioning means between the gate member and segment member comprising:

a rocker arm adjacent a side of one of the members and having a projection adjacent each end thereof, means mounting the rocker arm for pivotal movement about a fixed pivotal connection on said one member, said rocker arm having an elongated slot therein receiving a pin extending from the side of the other member; and guide means along the travel of the gate assembly to contact and guide said projections during travel of the gate assembly to hold the rocker arm in a relatively fixed position for maintaining the members in a retracted position, said guide means including a recess to receive one of said projections adjacent the fully closed position of the gate assembly thereby permitting pivoting of said rocker arm about its pivotal connection and camming of said other member through said pin and elongate slot for simultaneous expansion of the members along the wedging surfaces thereof at the closed position.

10. In a gate valve structure as set forth in claim 9 wherein said guide means comprises a pair of opposed guide rails, and a rocker arm is pivotally secured to opposed sides of the gate and segment members.

* * * * *